United States Patent
Herman

(10) Patent No.: US 10,006,222 B2
(45) Date of Patent: Jun. 26, 2018

(54) RAILING SUPPORT POST WITH THREADED RECEIVERS

(71) Applicant: Joel Duane Herman, Thurmont, MD (US)

(72) Inventor: Joel Duane Herman, Thurmont, MD (US)

(*) Notice: Subject to any disclaimer, the term of this patent is extended or adjusted under 35 U.S.C. 154(b) by 389 days.

(21) Appl. No.: 14/795,238

(22) Filed: Jul. 9, 2015

(65) Prior Publication Data

US 2015/0308148 A1    Oct. 29, 2015

Related U.S. Application Data

(63) Continuation of application No. 14/308,013, filed on Jun. 18, 2014, now Pat. No. 9,126,289, which is a
(Continued)

(51) Int. Cl.
| | |
|---|---|
| E04H 17/08 | (2006.01) |
| E04H 17/02 | (2006.01) |
| E04H 17/24 | (2006.01) |
| B23K 31/02 | (2006.01) |
| E04F 11/18 | (2006.01) |

(Continued)

(52) U.S. Cl.
CPC ............ *E04H 17/24* (2013.01); *B23K 31/02* (2013.01); *E04F 11/1814* (2013.01); *E04F 11/1859* (2013.01); *E04H 17/04* (2013.01); *E04H 17/10* (2013.01); *E04H 17/12* (2013.01); *E04H 17/20* (2013.01); *B21J 5/066* (2013.01); *E04F 11/1812* (2013.01); *E04F 2011/1819* (2013.01); *E04F 2011/1821* (2013.01); *E04H 2017/006* (2013.01)

(58) Field of Classification Search
CPC ......... E04H 17/02; E04H 17/06; E04H 17/08; E04H 17/10
See application file for complete search history.

(56) References Cited

U.S. PATENT DOCUMENTS

| | | | |
|---|---|---|---|
| 10,781 A | 4/1854 | Coons | |
| 489,116 A * | 1/1893 | Banta | E04H 17/10 256/52 |

(Continued)

FOREIGN PATENT DOCUMENTS

| | | |
|---|---|---|
| CH | 686009 | 11/1995 |
| DE | 102010062272 | 6/2012 |

(Continued)

OTHER PUBLICATIONS

PCT International Search Report and Written Opinion, PCT/US2013/049223, dated Sep. 24, 2013.

*Primary Examiner* — Michael P Ferguson
(74) *Attorney, Agent, or Firm* — Leveque IP Law, P.C.

(57) ABSTRACT

A railing support post with threaded holes or receivers for receiving threaded hardware, such as might be used for tensioned cable railing. A decorative sleeve or post cover may be used to at least partially enclose the railing support post. The railing support post may be manufactured, for example, by providing an elongated member of a prescribed length, drilling a plurality of holes spaced along the length of the elongated member, and tapping the plurality of holes to form a plurality of threaded receivers. The threaded receivers are configured to receive rail fittings or other fittings.

20 Claims, 12 Drawing Sheets

Related U.S. Application Data continuation-in-part of application No. 13/934,566, filed on Jul. 3, 2013, now Pat. No. 8,814,145.

(60) Provisional application No. 61/824,445, filed on May 17, 2013, provisional application No. 61/668,678, filed on Jul. 6, 2012.

(51) Int. Cl.
 *E04H 17/10* (2006.01)
 *E04H 17/20* (2006.01)
 *E04H 17/04* (2006.01)
 *E04H 17/12* (2006.01)
 *B21J 5/06* (2006.01)
 *E04H 17/00* (2006.01)

(56) References Cited

U.S. PATENT DOCUMENTS

| | | | |
|---|---|---|---|
| 693,061 A * | 2/1902 | Pegg | E04H 17/10 256/48 |
| 890,468 A | 6/1908 | Sutherland | |
| 1,517,119 A | 5/1921 | Luhring | |
| 1,664,321 A | 3/1928 | Quist | |
| 1,857,435 A | 5/1932 | Cole | |
| 2,315,516 A | 4/1943 | Gray | |
| D174,201 S | 3/1955 | Tedaldi et al. | |
| 3,717,327 A | 1/1973 | Schmidt et al. | |
| 3,720,401 A | 3/1973 | Lock et al. | |
| 3,921,960 A | 11/1975 | Bright | |
| 4,003,553 A | 1/1977 | Morris | |
| 4,048,776 A | 9/1977 | Sato | |
| 4,146,212 A | 3/1979 | Lermer | |
| 4,827,683 A | 5/1989 | Poole | |
| 4,882,891 A | 11/1989 | Sero et al. | |
| 5,419,538 A | 5/1995 | Nicholas | |
| 5,457,929 A | 10/1995 | Kim | |
| 5,586,423 A | 12/1996 | Mullen | |
| 5,660,013 A | 8/1997 | Saldarelli | |
| 5,755,431 A | 5/1998 | Williams | |
| 5,975,793 A | 11/1999 | Simmons et al. | |
| 6,053,281 A | 4/2000 | Murray | |
| 6,135,424 A | 10/2000 | Bracke | |
| 6,270,057 B1 | 3/2001 | Highley et al. | |
| 6,213,452 B1 | 4/2001 | Pettit et al. | |
| 6,290,212 B1 | 9/2001 | Bartel | |
| 6,336,623 B1 | 1/2002 | McCarthy | |
| 6,666,625 B2 | 12/2003 | Thornton | |
| 6,902,151 B1 | 6/2005 | Nilsson | |
| 6,948,283 B2 | 9/2005 | Burkart | |
| 7,048,090 B2 | 5/2006 | Dean et al. | |
| 7,063,186 B1 | 6/2006 | Granke | |
| 7,198,253 B2 | 4/2007 | Striebel et al. | |
| 7,306,203 B2 | 12/2007 | Platt | |
| 7,325,788 B1 | 2/2008 | Stanek et al. | |
| D567,397 S | 4/2008 | Terada et al. | |
| 7,497,640 B2 | 3/2009 | Sharp et al. | |
| 7,530,550 B2 | 5/2009 | Fattori | |
| 7,568,679 B2 | 8/2009 | Neusch | |
| 7,637,071 B2 | 12/2009 | Pryor | |
| 7,802,773 B2 | 9/2010 | Murphy | |
| 8,117,798 B2 | 2/2012 | Bergman | |
| 8,424,851 B2 | 4/2013 | Christoffer | |
| 9,033,637 B2 | 5/2015 | Mitrovic | |
| 9,126,289 B2 | 9/2015 | Herman | |
| 9,487,965 B2 | 11/2016 | Volin | |
| 2003/0155566 A1 | 8/2003 | Sax et al. | |
| 2004/0026679 A1 | 2/2004 | Terrels et al. | |
| 2005/0207838 A1 | 9/2005 | Striebel et al. | |
| 2006/0022189 A1 | 2/2006 | Collins | |
| 2006/0091371 A1 | 5/2006 | Cox et al. | |
| 2006/0140718 A1 | 6/2006 | Lamore | |
| 2006/0145131 A1 | 7/2006 | Purvis | |
| 2006/0151760 A1 | 7/2006 | Vyvyan-Vivian | |
| 2008/0079308 A1 | 4/2008 | Kretschmer | |
| 2008/0157046 A1 | 7/2008 | Murphy | |
| 2008/0222873 A1 | 9/2008 | Draht et al. | |
| 2008/0272353 A1 | 11/2008 | Fattori | |
| 2009/0050865 A1 | 2/2009 | Napier | |
| 2009/0315007 A1 | 12/2009 | Cox et al. | |
| 2010/0308293 A1 | 12/2010 | Larkins et al. | |
| 2012/0006964 A1 | 1/2012 | Bergman | |

FOREIGN PATENT DOCUMENTS

| | | |
|---|---|---|
| EP | 0585580 | 3/1994 |
| EP | 2006472 | 12/2008 |
| FR | 2303918 | 10/1976 |
| JP | 02-24447 | 1/1990 |
| WO | WO96/29490 | 9/1996 |

\* cited by examiner

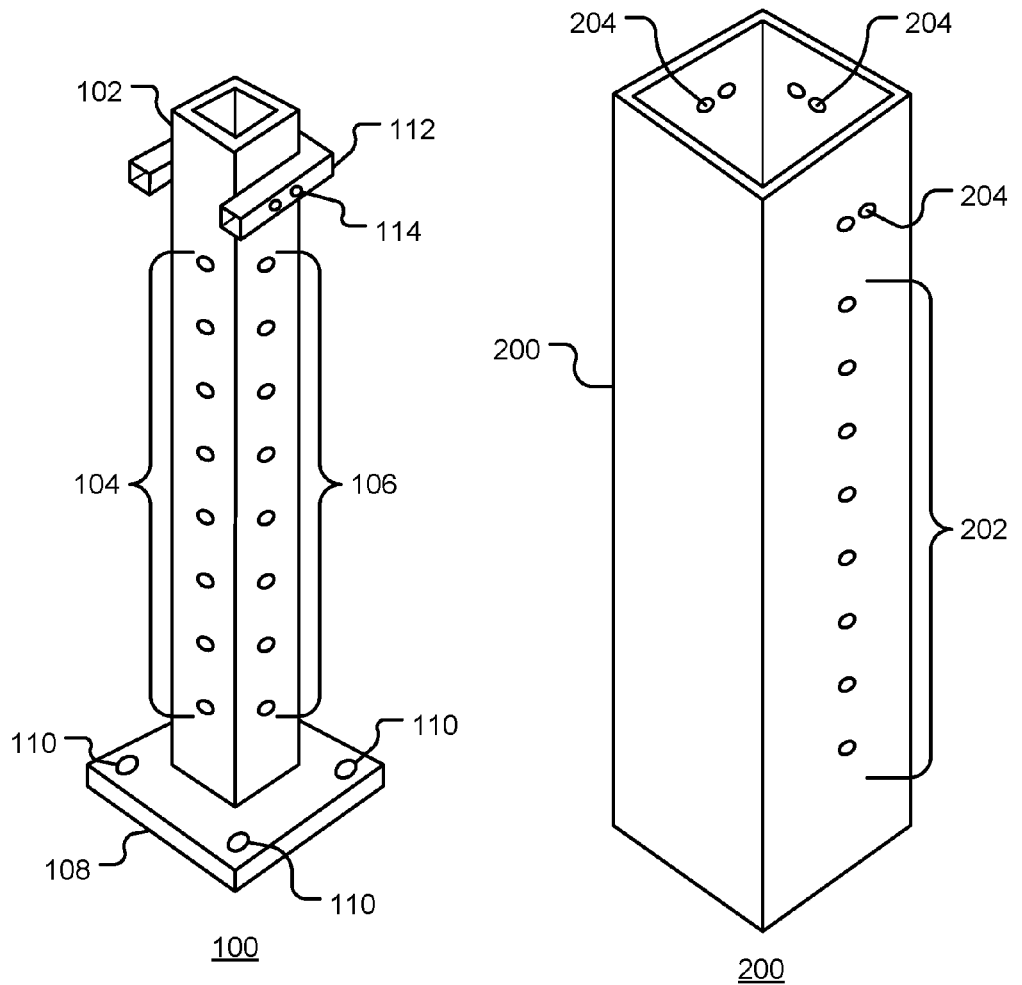
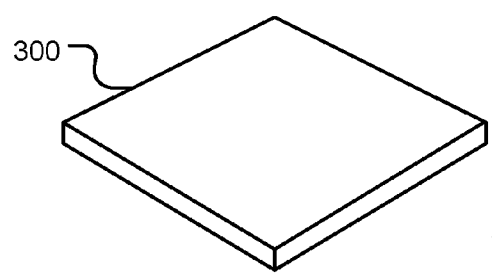
FIG. 1  FIG. 2
FIG. 3

RAILING SUPPORT POST WITH THREADED RECEIVERS

PRIORITY CLAIM

This application is a continuation application of U.S. application Ser. No. 14/308,013 filed on Jun. 18, 2014 entitled "Railing Support Post with Threaded Receivers", which is a continuation-in-part application of U.S. application Ser. No. 13/934,566 filed on Jul. 3, 2013 entitled "Railing Support Post with Threaded Receivers", which claims the benefit of Provisional Application 61/668,678 filed on Jul. 6, 2012 entitled "Cable Railing System," and Provisional Application 61/824,445 filed on May 17, 2013 entitled "Structural Post with Threaded Receivers". The subject matter of the aforementioned applications is hereby incorporated by reference.

BACKGROUND

The use of decorative post covers and columns has become increasingly popular in the railing industry. The post covers and columns are often used to cover unattractive metal fittings and connectors for cable railing or other types of railings. Traditionally, a wood post, such as a 4"×4" post, for example, has been used to transfer railing structural and force components to the deck or surface on which the inner post is attached, and a decorative wood, fiberglass, PVC or composite sleeve is placed over the inner wood post.

In keeping with such decorative columns or sleeves being decorative, they often do not provide very much mechanical strength or integrity to the railing systems in which they are employed, often being columns or sleeves made of composite materials or fiberglass. Additionally, cable railings are typically lagged into wood posts internal to the decorative sleeve or column, in a labor intensive process requiring the use of expensive hardware and a structural post abutting the column.

BRIEF DESCRIPTION OF THE DRAWINGS

Example embodiments of the present disclosure will be described below with reference to the included drawings such that like reference numerals refer to like elements and in which:

FIG. 1 is a diagrammatic representation of railing support post, consistent with certain embodiments;

FIG. 2 is a diagrammatic representation of a decorative sleeve for a railing support post, consistent with certain embodiments;

FIG. 3 is a diagrammatic representation of a decorative sleeve cap for a railing support post, consistent with certain embodiments.

DETAILED DESCRIPTION

Figure 4:
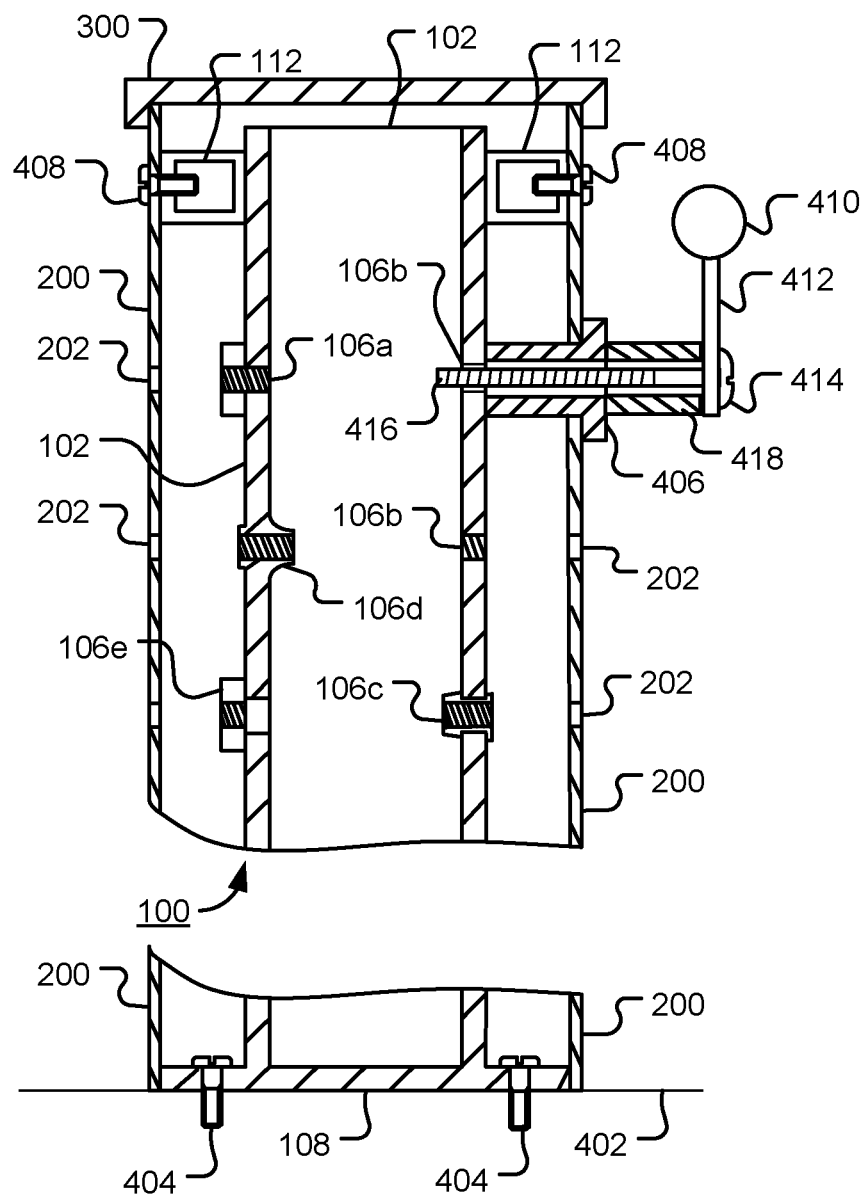
FIG. 4 is a cross-sectional view of an assembly of a railing support post, a decorative sleeve, and a decorative sleeve cap, consistent with certain embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The terms "a" or "an", as used herein, are defined as "one" or "more than one". The term "plurality", as used herein, is defined as "two" or "more than two." The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment", "an example", "an implementation", "an example" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the various embodiments described herein there is provided a railing support post with pre-threaded, pre-drilled receivers or inserts, or threaded holes that provides not only structural support to a decorative sleeve that may be placed over it, but by having threaded receivers additionally provides a quick and easy way to connect railing fittings to the railing support post. An exemplary embodiment is shown in FIG. 1. The railing support post 100 includes an elongated member 102 having rows of threaded receivers 104, 106 spaced along the length of the elongated member. In FIG. 1, the elongated member 102 has a first line of threaded receivers 104 in a first face or side of elongated member 102 and a second line 106 in a second face or side of elongated member 102. The other faces of the elongated member may also include threaded receivers. The threaded receivers are configured to receive rail fittings suitable for cable railings, but may be used alone.

The elongated member 102 has sufficient strength to support railings, handrails or other fittings, coupled via the threaded receivers 104, 106, to it. The threaded holes or receivers 104, 106 of the railing support post 100 are spaced in accordance with spacing of railing to be attached to it and so can support industry standard railing. The post height may correspond to an industry standard height, such as 36 inches for residential use and 42 inches for commercial use, for example. Thus, the railing support post 100 may be a 36 inch residential post or a 42 inch commercial post. It will be understood that railing support posts of varying heights may be used without departing from the spirit and scope of the described embodiments. For example, a shorter railing support post could be mounted on a knee wall, while a longer railing support could be mounted with a column or side-mounted on a facia.

The railing support post may be made of metal, such as stainless steel, aluminum, bronze, or other metal material, or composite material such as material with carbon fibers, etc., with pre-threaded holes or receivers, thereby allowing cables or other railings of a railing system to be attached via standard stainless steel or other known hardware and fitting options to this railing support post. The threaded receivers 104, 106 of the railing support post 100 may be evenly spaced threaded holes (such as vertically to meet code) that are used when cable infill is needed or desired.

While the railing support post is illustrated as being substantially rectangular in shape, it is not so limited and may in fact be at least partially round or other shapes. Here, the term "rectangular" is defined to include "square".

As described below, a separate bracket may be used for the graspable handrail when desired or needed, as for a 42 inch commercial application, for example.

The railing support post may be mounted to a variety of surfaces, such as decking, stairs, flooring, etc. To facilitate mounting, a base 108 may be fixed to the lower end of the elongated member 102. One or more holes 110 in the base may be provided for fasteners.

The railing support post 100 also includes a sleeve support 110 coupled to the elongated member 102, the sleeve support 110 is configured to support a decorative sleeve such that the elongated member is located in the interior of decorative sleeve. The sleeve support 110 may include one or more threaded holes 112 to enable coupling of the post 100 to a decorative sleeve and/or a handrail.

When used for guardrail protection or with hand rails together with hollow composite sleeves, the railing support posts allow for cables to be attached from any direction. Thus, the railing support post may be an end post, a corner post, an intermediate post, etc. The railing support post may then work in concert with other posts of an overall railing system. For example, intermediate posts may be used in long sections of railing or fencing, where cable railing passes straight through the intermediate posts, or may operate independent of other posts. Accordingly, threaded receivers may be located on one or more sides and may be used to receive rail fittings or to allow passage of a cable rail. In one embodiment, threaded receivers are located on four sides of the elongated member.

FIG. 2 is a diagrammatic representation of a decorative sleeve or post cover 200 configured to at least partially enclose a railing support post. The decorative sleeve 200 may be constructed of a light-weight, non-structural material, such as PVC or fiberglass. One or more holes 202 may be provided to allow railing fittings to pass through the sleeve to threaded receivers in the interior railing support post. Additional holes 204 may be provided to enable coupling of the decorative sleeve 200 to a sleeve support of the railing support post.

The decorative sleeve may be provided without holes 202 and 204. The holes may be added, as needed, during installation of a railing assembly. To facilitate installation, a drill-hole template may be provided to indicate where holes may be drilled in the decorative sleeve so as to align with the threaded receivers in the elongated member. The template, support post, decorative sleeve and other components may be provided as a kit.

In an exemplary embodiment, the elongated member has a substantially square cross-section, with outside width approximately 2 inches. In a further embodiment the outside width is in the range 1-3 inches. Larger or smaller widths may be used without departing from the present disclosure.

The elongated member may have a solid, hollow, U-shaped, L-shaped, T-shaped, H-shaped, I-shaped, round, rectangular or other cross-section. The elongated member may be constructed of a thin-walled material, such as ⅛", 3/16", ¼" or 5/16" metal. Other materials and material thicknesses may be used, provided the railing support post has sufficient strength to support one or more railings.

In an exemplary embodiment, the decorative sleeve has a substantially square cross-section, with outside width approximately 5 inches. In a further embodiment the outside width is in the range 4-6 inches. Larger or smaller widths may be used without departing from the present disclosure.

The decorative sleeve 200 is sized to pass over the elongated member and the base support bracket of the railing support post.

In an exemplary embodiment, the base support bracket of the railing support post is substantially square, with width approximately 4.2 inches. In a further embodiment the outside width is in the range 2-7 inches. Larger or smaller widths may be used without departing from the present disclosure.

FIG. 3 is a diagrammatic representation of a decorative sleeve cap 300 configured to be located on top of a decorative sleeve. In a further embodiment, the decorative cap 300 is integral with the decorative sleeve. A variety of cap styles will be apparent to those of ordinary skill in the art. In some embodiments, the cap is integrated with the decorative sleeve.

FIG. 4 is a vertical, cross-sectional view through an assembly of a railing support post 102, a decorative sleeve 200 and a decorative sleeve cap 300, in accordance with one or more embodiments. Various embodiments of threaded receivers 106 are shown by way of explanation. In practice, a railing support post may contain a single type of threaded receiver. Receiver 106a comprises a front-plate, with both the front-plate and elongated member 102 being threaded. Receiver 106b comprises a simple threaded hole in the elongated member 102. Receiver 106c comprises a threaded insert. Receiver 106*d* comprises a threaded flow-drilled hole. Receiver 106*e* comprises a threaded front-plate. Other types of threaded receivers will be apparent to those of ordinary skill in the art.

In the example embodiment shown, the railing support post is coupled to a surface 402 using fasteners 404. Various types of fasteners may be used.

Railing fittings that are configured to be placed in tension may be passed through holes 202 in the decorative support sleeve 200 and screwed into threaded receivers 106 of the railing support post. Fittings that require a mating surface may be coupled via a spacer, such as hollow spacer 406 that rests against the elongated member 102. Spacer 406 provides an external mating surface and is sized to span the gap between the elongated member 102 and the exterior of the decorative sleeve 200, passing through a hole in the decorative sleeve 200. The spacer 406 is adapted to protect the decorative sleeve from compressive loads when a rail fitting is coupled to the threaded receiver of the elongated member. Spacer 406 may also be used, for example, when a cable rail is angled diagonally up or down, as for a step or stair railing to prevent loading of the decorative sleeve.

The decorative sleeve 200 may be attached to the sleeve support 112 of the railing support post via a fastener 408.

Together, the decorative sleeve 200 and support cap 300 enclose the railing support post 300.

The railing support post allows for the tensioning of cables to be transferred to the surface of the railing support post inside a decorative sleeve, thereby allowing the decorative sleeve or shell to become lighter and more decorative.

A top handrail or guard rail may be bolted directly to the railing support post using the threaded holes in the top sleeve support 112. In one example embodiment, the sleeve support 112 comprises square tubing, such as 1 inch square, for example. This will accommodate all angles that a standard stair arrangement might use. The sleeve supports 112 may be attached at one or more positions on the elongated member. The sleeve support may be pre-attached, by welding or bonding for example, or may be attached using fasteners. The sleeve support is sized to accommodate the decorative sleeve to be used.

A grab-rail 410 may be attached to the railing support post via spacer 406 and bracket 412. A threaded fastener 414 passes through the spacer 406 and the threaded portion 416 of the fastener screws into a threaded receiver of the elongated member 102. An additional hollow spacing element 418 may be used to provide a stand-off. Optionally, elements 406 and 418 may be combined as a single spacer that enables the bracket 412 to be coupled to the elongated member 102 without loading the decorative sleeve 200.

In a further embodiment, the sleeve support is integrated with the decorative sleeve. In a still further embodiment, the decorative cap is integrated with the decorative sleeve. In a still further embodiment, the sleeve support, the decorative sleeve and the decorative cap are integrated. For example, the sleeve support, the decorative sleeve and the decorative cap may be molded as a single plastic part.

Figure 5:
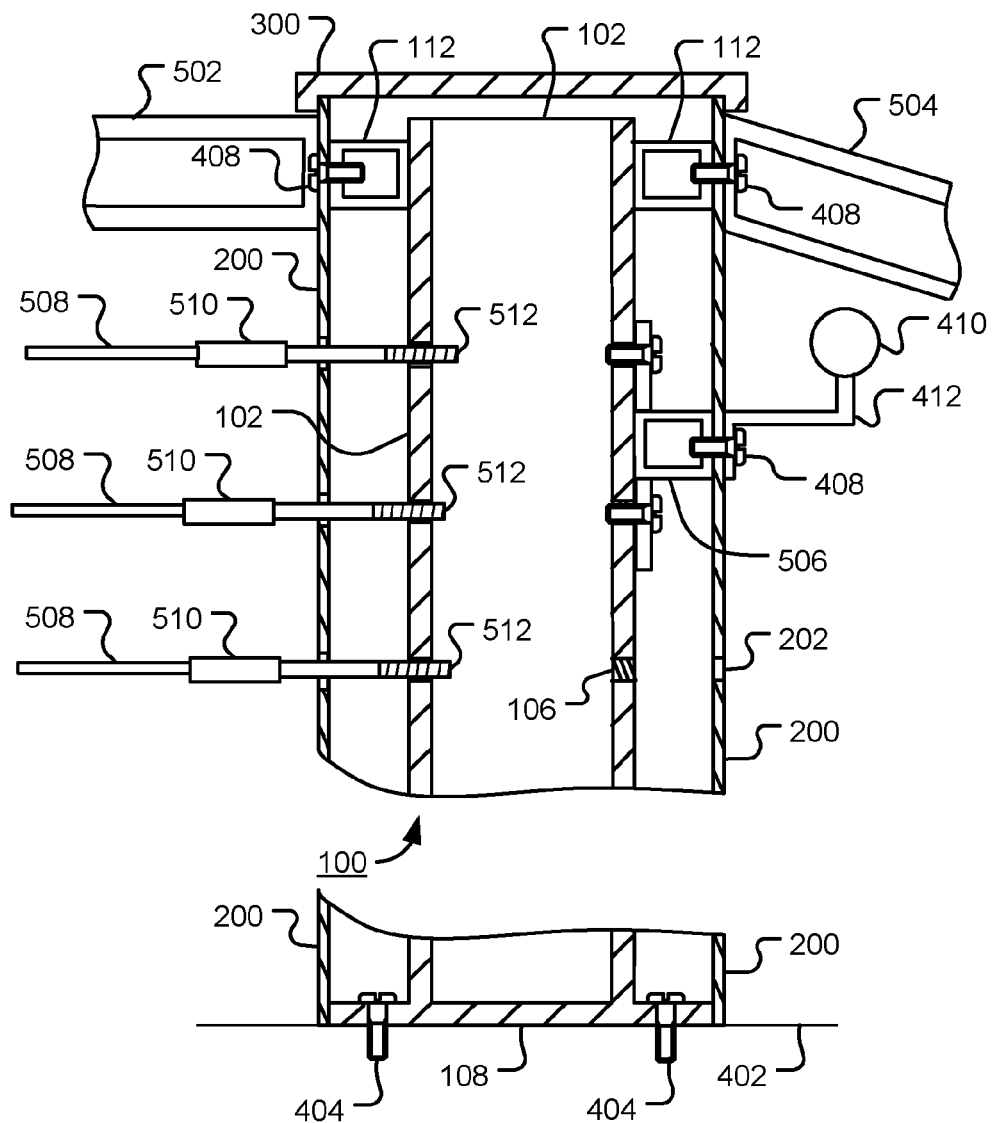
FIG. 5 is a cross-sectional view of an assembly of a railing support post, a decorative sleeve, a decorative sleeve cap and an exemplary rail fitting, consistent with certain embodiments.

FIG. 5 is a vertical, cross-sectional view through an assembly of a railing support post 102, a decorative sleeve 200, a decorative sleeve cap 300 and exemplary railing fittings, in accordance with various embodiments. A horizontal guardrail 502 may be coupled to the sleeve support 112. Mechanical loads placed on the guardrail 502 are carried by the elongated member 102 of the railing support post rather than by the decorative sleeve 200. A grab-rail 410 may be coupled to the elongated member by a support bracket 506. In the example shown, the support bracket 506 has a flange that is mounted to the elongated member 102 using two threaded receivers. In one example embodiment, the attachment point of the bracket 506 may be located approximately one fourth of the way between the flange holes and/or may be invertible to allow for a variety of handrail heights. By way of illustration, the grab-rail 410 and support bracket 506 are depicted as being coupled to the right of the elongated member 102. However, the grab-rail 410 and support bracket 506 may be coupled to the front or back face of the elongated member 102 so as to provide a grab-rail 410 running parallel to the cable sections 508.

Cable sections 508 may be attached to the threaded receivers 106 of the railing support post using fittings 510. The fittings 510 have a threaded section 512 that may be screwed in a threaded receiver to hold the cable section 508 in tension. The fittings 510 pass through the decorative sleeve 200 but are not supported by it. Thus, the decorative sleeve 200 may be constructed of various light weight decorative materials.

The fittings 510 may have two threaded ends 512. One threaded end of a fitting may have left-hand thread and the other end a right-hand thread to facilitate tensioning. One threaded end allows coupling to a cable rail while the other threaded end 512 allows coupling to the elongated member 102. Tension in the cable section 508 may be adjusted by rotating the body of the fitting. Rotation may be facilitated by a hexagonal, square, or flattened section of the fitting.

Figure 6A:
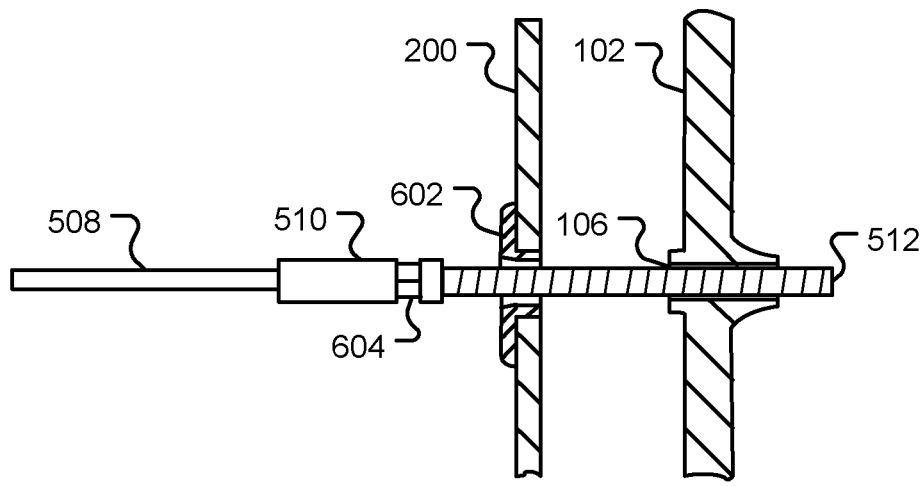
FIGS. 6A and 6B are further cross-sectional views of an assembly of a railing support post, a decorative sleeve and exemplary rail fitting, consistent with certain embodiments.

FIG. 6A is a partial, cross-sectional view through an assembly of a railing support post 102, a decorative sleeve 200 and exemplary railing fittings, in accordance with various embodiments. A cable section 508 is passes through a flow-drilled hole 106 in the decorative sleeve or post cover 200 and is coupled to the elongated member 102. Insert 602 may be screwed on the threaded portion 512 of the rail fitting 510 and functions to protect the decorative sleeve 200 surround the fitting and to enhance appearance of the assembled railing. The fitting may be provided with a hexagonal, square, or flattened section 604 to facilitate tensioning of the cable section 508. Other types of fittings will be apparent to those of ordinary skill in the art.

Figure 6B:
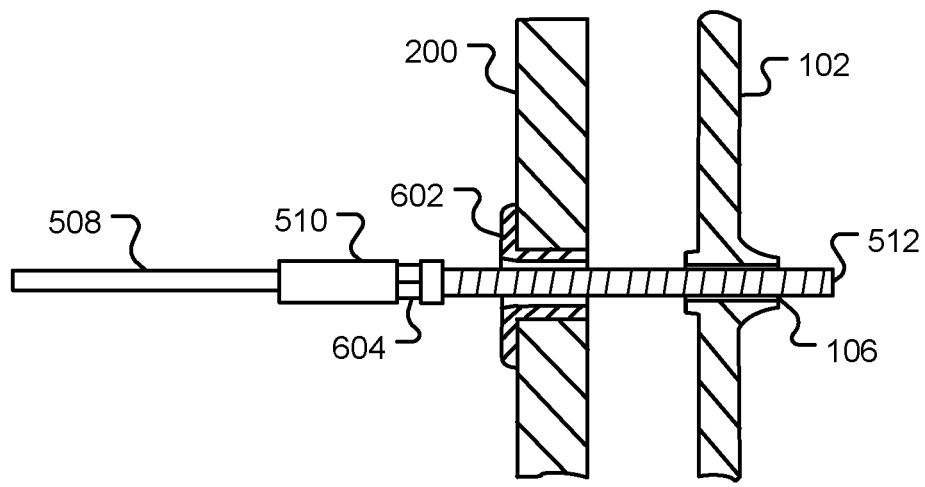

In FIG. 6A, the wall thickness of decorative sleeve or post cover 200 is depicted as being thinner than the wall thickness of the elongated member 102. However, other wall thicknesses may be used without departing from the present disclosure. For example, FIG. 6B is a partial, cross-sectional view through an assembly of a railing support post 102, a decorative sleeve 200 and exemplary railing fittings, in accordance with an embodiment. In this embodiment, the wall thickness of decorative sleeve or post cover 200 is depicted thicker than the wall thickness of the elongated member 102.

Figure 7:
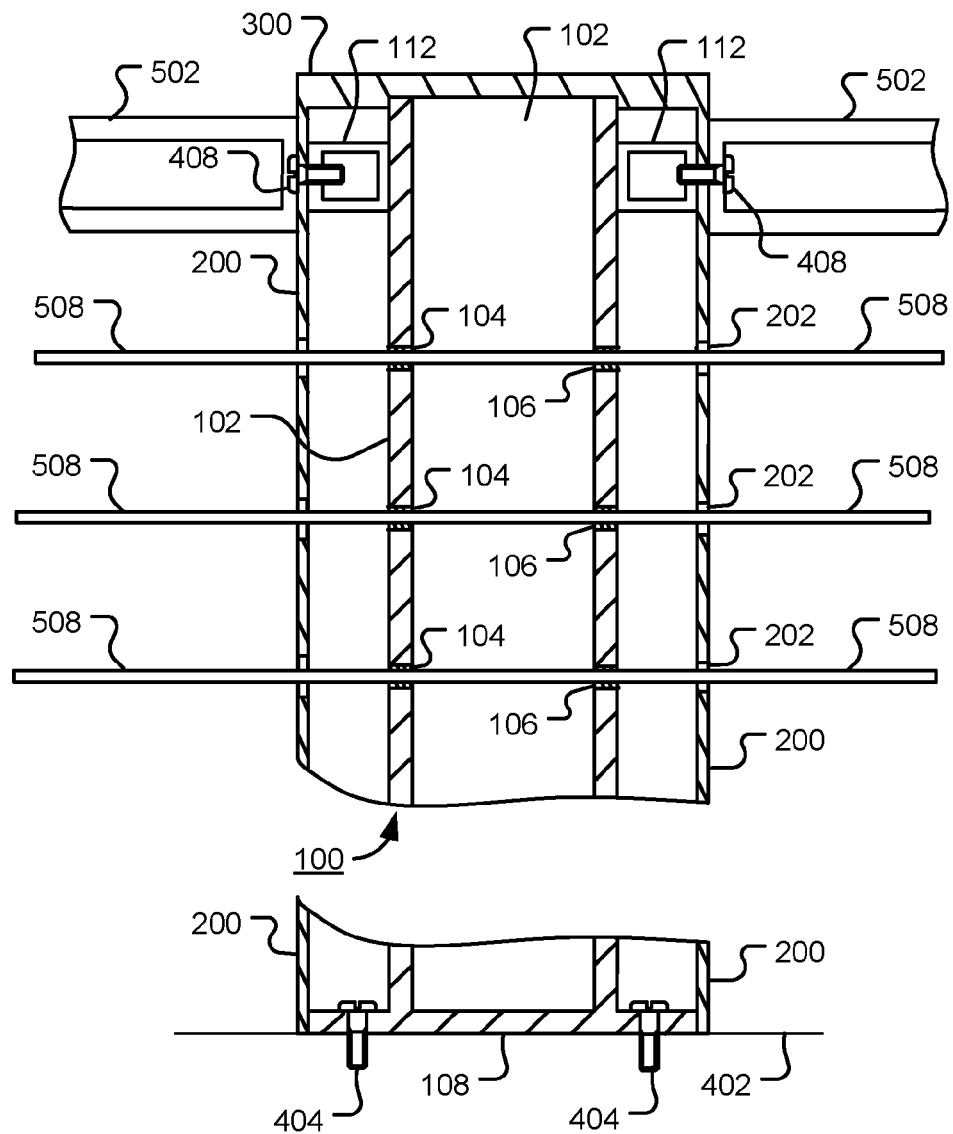
FIG. 7 is a cross-sectional view of an assembly of a railing support post, a decorative sleeve, a decorative sleeve cap and an exemplary rail fitting, consistent with certain embodiments.

FIG. 7 is a cross-sectional view of an assembly of a railing support post 100, a decorative sleeve 200, a decorative sleeve cap 300 and exemplary rail fittings 510, consistent with certain embodiments. The base support bracket 108 is fastened to the surface 402 using fasteners 404. The decorative sleeve 200 is placed over the elongated member 102 of the railing support post 100, and decorative cap 300 is installed. Guard rails 502 are attached to the sleeve support 112 of the railing support post using fasteners 408. In the embodiment shown, the cable rails 508 extend through threaded receivers 106 the elongated member 102 and holes 202 in the decorative sleeve 200 to emerge on the opposite side of the decorative sleeve. In this way, the cable rails 508 can continue through one or more railing support posts to extend the rail. In addition, a variety of rail fittings may be used. The rail fitting may be configured to facilitate screwing the fitting into a threaded receiver to apply tension to the attached cable rail.

In the embodiment illustrated in FIG. 7, the decorative cap 300 is incorporated with the decorative sleeve 200. In addition, the elongated member may be embedded in the decorative cap to provide the sleeve support.

The railing support post may also be used in conjunction with many kinds of lighting fixtures, should the need arise.

A wide variety of materials may be used for each of the various components, fixtures, and elements described herein, including aluminum, stainless steel, steel, wood, cast aluminum, brass, bronze, aluminum bronze, nickel aluminum bronze, nick bronze, carbon fiber, and plastic, as well as cast, extruded or extrusion parts.

Figure 8:
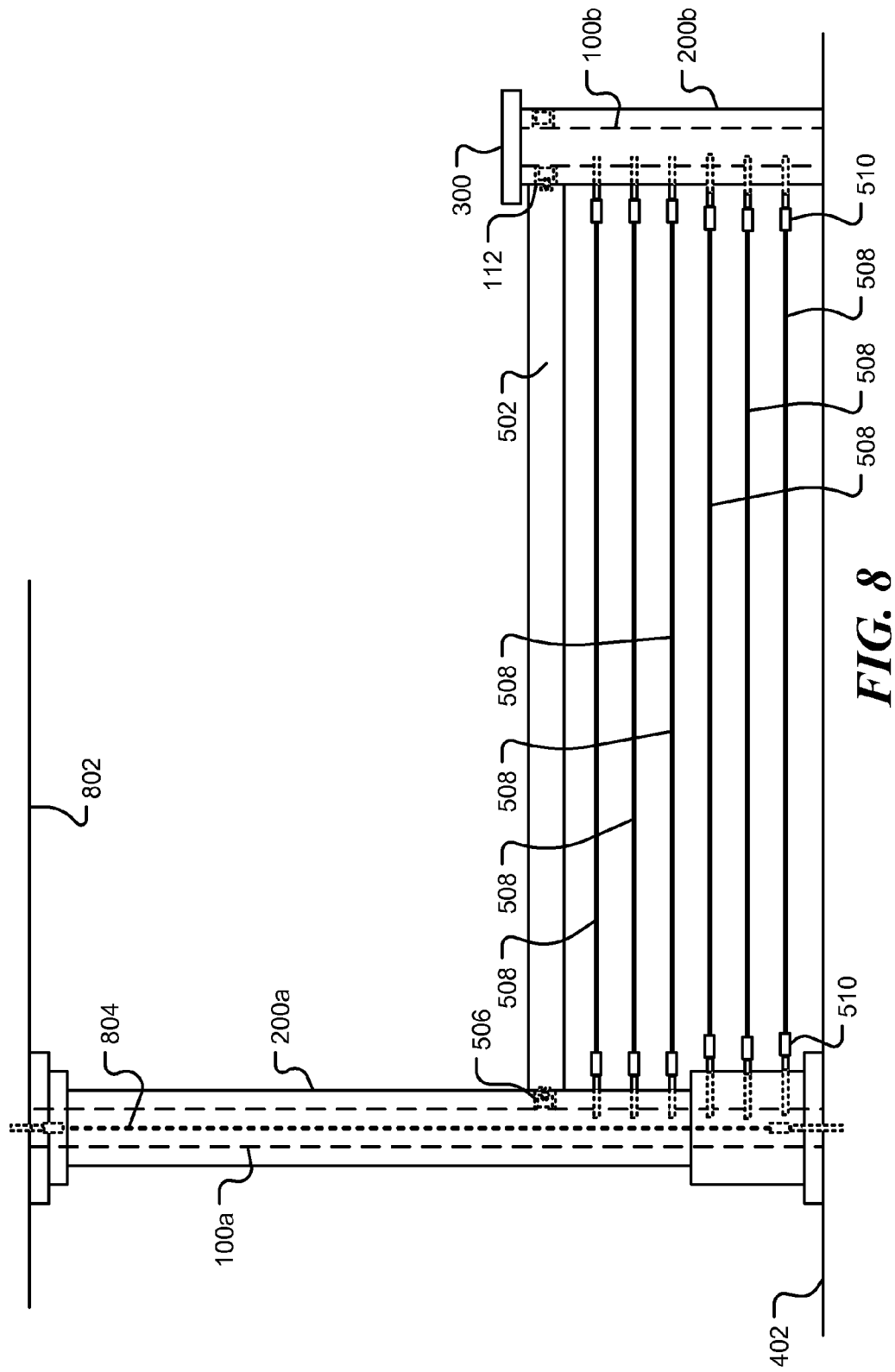
FIG. 8 is a view of a railing assembly utilizing two railing support posts, consistent with certain embodiments.

FIG. 8 is a view of a railing assembly using two railing support posts, consistent with certain embodiments. The first railing support post 100a is located in a decorative sleeve 200a that take the form of a pillar that extends from floor 402 to ceiling 802. A cable 804 may be stretched between the floor 402 and the ceiling 802 to help support the railing support post 100a and help meet hurricane "lift-off" requirements. A second railing support post 100b is fastened to the floor 402. The railing support post 100b may be fastened using a base support bracket, a cable fastened to the floor, or a combination thereof. The railing support post 100b is covered by a decorative sleeve 200b and a decorative cap 300. A guard rail 502 is coupled to the first railing support post 100a via bracket 506 and to the second railing support post via sleeve support 112. A number of cable rails 508 are stretched between the two railing support posts. The cable rails 508 are coupled to the railing support posts using fittings 510 that screw into threaded receivers of the railing support posts. The fittings 510 enable the tension in the cable rails to be adjusted. The tension is supported by the railing support posts 100a and 100b so that the decorative sleeves 200a and 200b can be constructed of light-weight decorative materials. The height of the guard rail 502 and the spacing between cable rails 508 may be selected to meet building codes. The cable rail spacing may be predetermined, so that the threaded receivers can be fabricated when the support post is manufactured, thereby minimizing the installation time of a railing assembly.

In an exemplary embodiment, the threaded receivers are evenly spaced at approximately 3.09 inch spacing. However, other spacing may be used.

Figure 9:
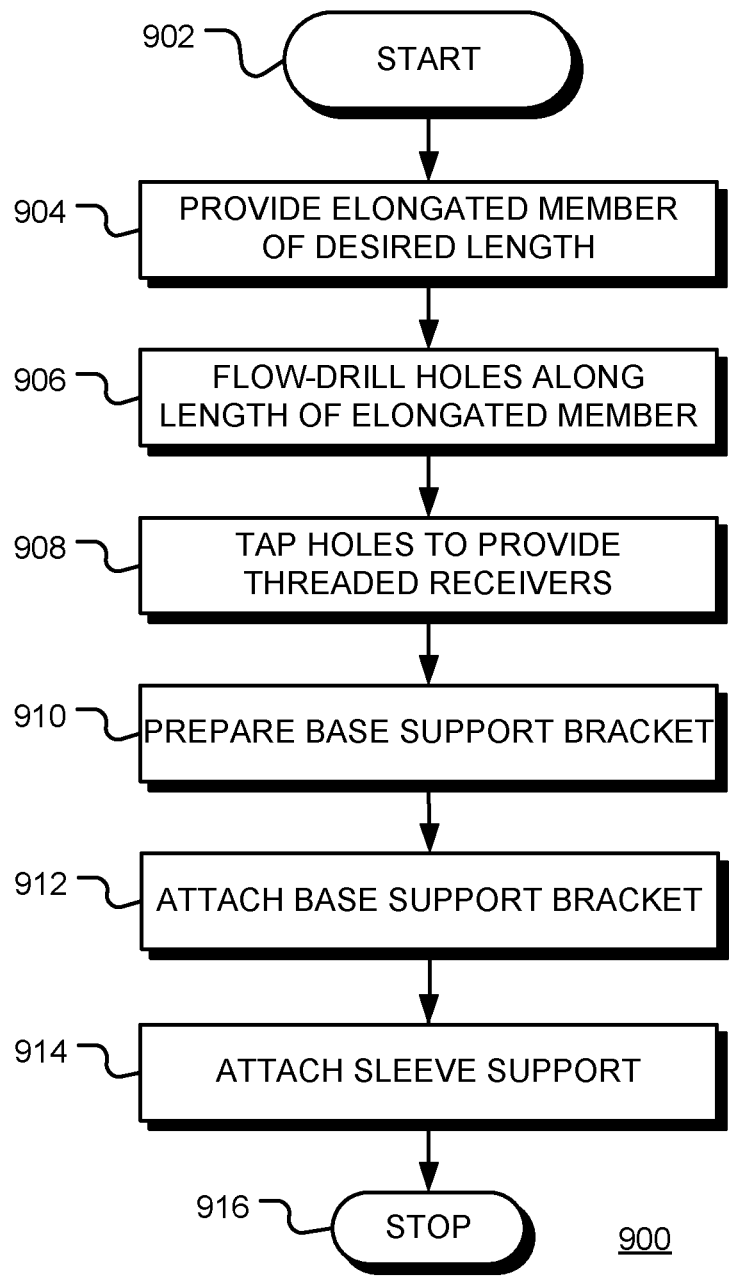
FIG. 9 is a flow chart of a method for manufacturing a railing support post, consistent with certain embodiments.

FIG. 9 is a flow chart 900 of a method for manufacturing a rail support post, in accordance with certain embodiments of the disclosure. Following start block 902, an elongated member of a desired length is provided. The desired length may correspond to a standard length specified in a building codes, or may be a custom length. At block 906 a plurality of holes are drilled in the elongated member. The holes are spaced in a row along the length of the elongated member. Rows of holes may be place on some or all sides of the elongated member. The elongated member may have a hollow or solid cross-section. When a hollow or angular cross-section is used, the holes may be drilled using flow-drilling, so as to increase the thickness of the elongated member in the vicinity of the hole and provide an increased thread length. This approach allows thinner materials to be used without the use of front- or back-plates to increase the thread length. However, other methods may be used to create the holes, such as conventional drilling, laser cutting, punching, etc. The holes are tapped at block 908 to form a plurality of threaded receivers. The threaded receivers are configured to receiver rail fittings due use, and may be fabricated by other means.

At block 910, a base support bracket is prepared. In one embodiment, the base support bracket is made by cutting the bracket from a sheet of metal and drilling or cutting holes in it to enable it to be attached to a mounting surface. Optionally, a lower sleeve support may be incorporated. In one embodiment this may be done by machining one or more steps in the block to form one or more raised platforms sized to fit inside a hollow decorative sleeve placed over the post. In a further embodiment, one or more upper plates may be added in a stack to form one or more raised platforms, again sized to fit inside a hollow decorative sleeve placed over the post. The edges or corners of an upper plate may be bent upwards to guide the plate(s) inside the decorative sleeve.

At block 912, a base support bracket is attached to an end of the elongated member, the base support bracket being configured to enable the elongated member to be fastened to a surface when in use. The base support bracket may be attached by welding or bonding, for example.

At block 914, a sleeve support is attached to the elongated member. The sleeve is configured to provide support for a decorative sleeve that, at least partially, encloses the elongated member in use. The sleeve support may be attached by welding or bonding, for example. The manufacture terminates at block 916.

Additional manufacturing steps may be performed. For example, if the support post is constructed of stainless steel, a passivation step may be included. For other materials, an anti-corrosion coating may be applied, for example.

As described above a cable rail support post may be produced by a process comprising: providing an elongated member having one or more walls, flow-drilling a number of holes in at least one walls of the elongated member, the holes spaced along a length of the elongated member. Flow-drilling a hole increases the thickness of the wall in the vicinity of the hole. The flow-drilled holes are tapped to produce multiple threaded receivers spaced along a length of the elongated member, that can be used to receive cable rail fittings. A base support bracket is attached to a lower end portion of the elongated member, the base support bracket configured to enable the cable rail support post to be fastened to a surface. A sleeve support may be joined to the elongated member, at the upper or lower end portion, for example, the sleeve support adapted to support a decorative sleeve that at least partially encloses the elongated member. In one embodiment, the base support bracket is welded to the first end portion of the elongated member.

The base support bracket may have one or more raised platforms, each raised platform sized to match an interior dimension of a hollow decorative sleeve. The platforms may be produced by machining or casting one or more steps may be machined or cast around a perimeter of the base support bracket. In a further embodiment, two or more plate elements of different sizes are joined in a stack to produce the base support element. The plates may be cut from sheet metal.

In one embodiment, the base support bracket comprises a lower plate and an upper plate. The lower plate is joined to and supports the lower end portion of the elongated member. The lower plate has a first set of holes to enable the cable rail support post to be attached to a surface. The upper plate is sized to match an interior dimension of a hollow decorative sleeve, and is mountable on the lower plate such that a second set of holes in the upper plate aligns with first set of holes of the lower plate. The lower plate is adapted to support a decorative sleeve passed over the elongated member.

Optionally, at least one side portion of the upper plate is bent upwards to facilitate alignment of a hollow decorative sleeve around the upper plate.

The lower plate may be cut from sheet metal of a first thickness, while the upper plate is cut from sheet metal of a second thickness, the second thickness less being than the first thickness.

A lateral dimension of the base support bracket may be approximately 4" and a thickness of the base support bracket may be greater than 5/16" in certain embodiments. The base support bracket may be approximately square, or another shape.

In one embodiment, the elongated member is made of metal and has a wall thickness of between 1/16" and 3/8".

The cable rail support post may be manufactured by providing an elongated member having one or more walls, providing a base support bracket, and forming a set of threaded receivers spaced along a length of the elongated member. A threaded receiver may be produced by flow-drilling a hole in the elongated member, where the flow drilling increases the thickness of the wall in the vicinity of the hole, and tapping the flow-drilling hole. Two or more mounting holes are made in the base support bracket and the base support bracket is welded to an end of the elongated member. The threaded receivers are configured to receive rail fittings.

The base support bracket and the mounting holes may be cut from a sheet of metal having a thickness between 1/4" and 3/4", and one or more steps may be machined around a perimeter of a plate element to provide one or more raised platforms, each raised platform being sized to match an interior dimension of a hollow decorative sleeve. Alternatively, the base support bracket may be made by casting a plate element having one or more steps around its perimeter, each raised platform being sized to match an interior dimension of a hollow decorative sleeve.

In a further embodiment, the base support bracket is made by joining two or more plate element of different sizes in a stack to provide one or more raised platforms, each raised platform being sized to match an interior dimension of a hollow decorative sleeve.

Figure 10:
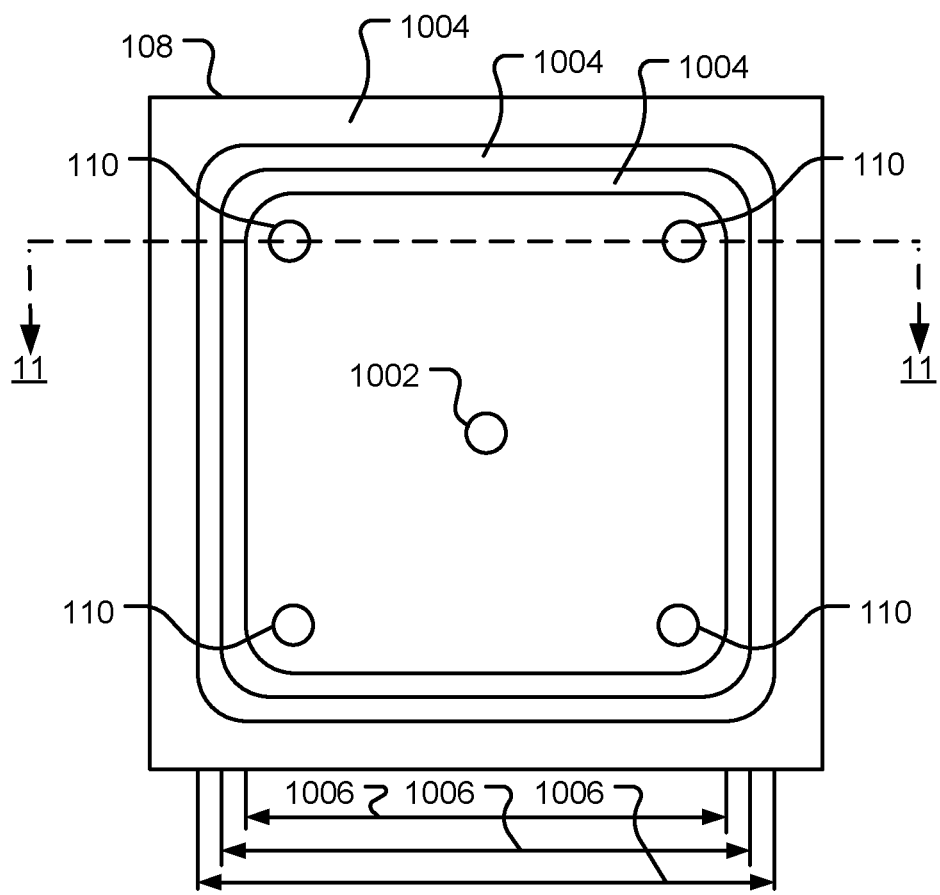
FIG. 10 is a diagrammatic representation of a base support plate, consistent with certain embodiments.

FIG. 10 is a diagrammatic representation of a base support plate, consistent with certain embodiments. Referring to FIG. 10, the base support bracket 108 has a number of holes 110 that enable the bracket to be attached to a mounting surface, such as deck or floor, using fixings such bolts or screws that pass through the holes. An additional hole 1002 may be included to allow for drainage of water from the interior of the post. A number of steps 1004 are provided such that the bracket comprises a number of raised platforms of different sizes. The dimensions of the platforms, indicated by the arrows 1006 for example, are selected to correspond to or be just less than the interior dimension of a hollow decorative sleeve placed over the post. The decorative sleeve is discussed in more detail above. In one embodiments, a single raised platform may be used. In a further embodiment, a series of platforms are used to accommodate decorative sleeves with different internal dimensions.

In one embodiment, the base 108 is approximately 4" square, the upper raised platform is approximately 3.66" square, the middle raised platform is approximately 3.77" square and the lower raised platform is approximately 3.83" square. However, it will be apparent to those of ordinary skill in the art that other dimensions may be used.

In FIG. 10, the raised platforms are substantially square. However, other shapes may be used, such as elliptical, circular, triangular, etc.

Figure 11:
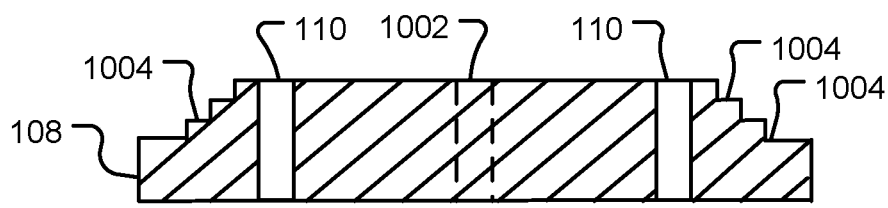
FIG. 11 is a view of the section 11-11 shown in FIG. 10.

FIG. 11 is a view of the section 11-11 shown in FIG. 10. The base support bracket has a number of steps 1004 that form a number of raised platforms. The base support bracket may be produced by machining the steps in a metal plate or by casting. Machining may be performed by a known process, such as turning, milling, planing, shaping, broaching, grinding, ultrasonic machining, chemical machining, electrical discharge machining, electrochemical machining, high-energy beam machining, etc.

In one embodiment, the height of the steps is approximately 1/16". In a further embodiment the height of the steps is greater than 1/16".

Figure 12:
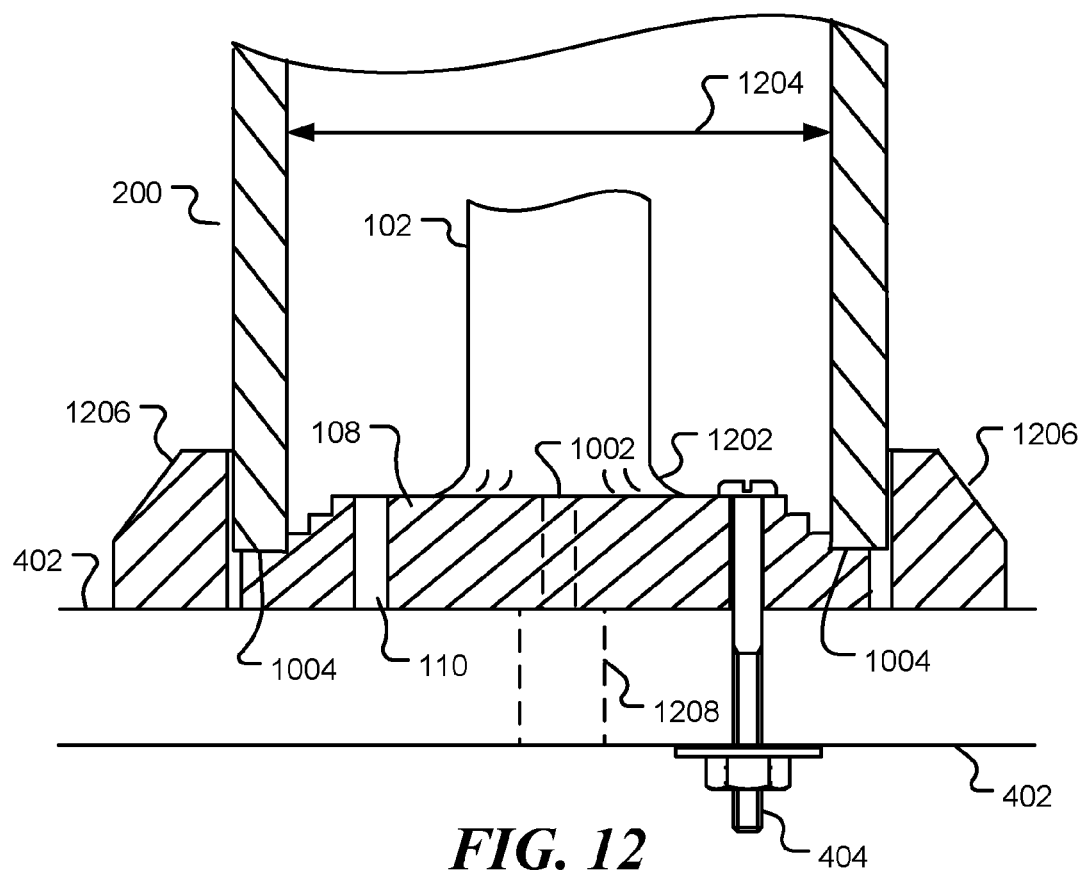
FIG. 12 is a diagrammatic representation of a cross-sectional view of a lower portion of a cable railing support post assembly, consistent with certain embodiments.

FIG. 12 is a diagrammatic representation of cross-section of a lower portion of a cable railing support post assembly, consistent with certain embodiments. The assembly includes the elongated member 102 and the base support bracket 108 that form the cable rail support post. The base support bracket is attached to surface 402 using fixing 404 that passes through a hole 110 in the bracket. In practice, fixings 402 would be placed in two or more of the holes 110. The assembly also includes a hollow decorative sleeve 200 that passes over the elongated member 102 and rests on a step 1104 of the base support bracket 108. In the example shown, the sleeve rests on the lower step. Sleeves with smaller internal dimension 1204 might rest on a different step. A decorative collar 1206 may be placed around the base of the support post and sleeve to hide the edges of the base support bracket 108 and the lower end of the sleeve 200. In this example, hole 1208 is aligned with hole 1002 to provide drainage. In this example, the raised platforms are integral to (part of) the base support bracket and provided a lower support for the decorative sleeve 200.

Figure 13:
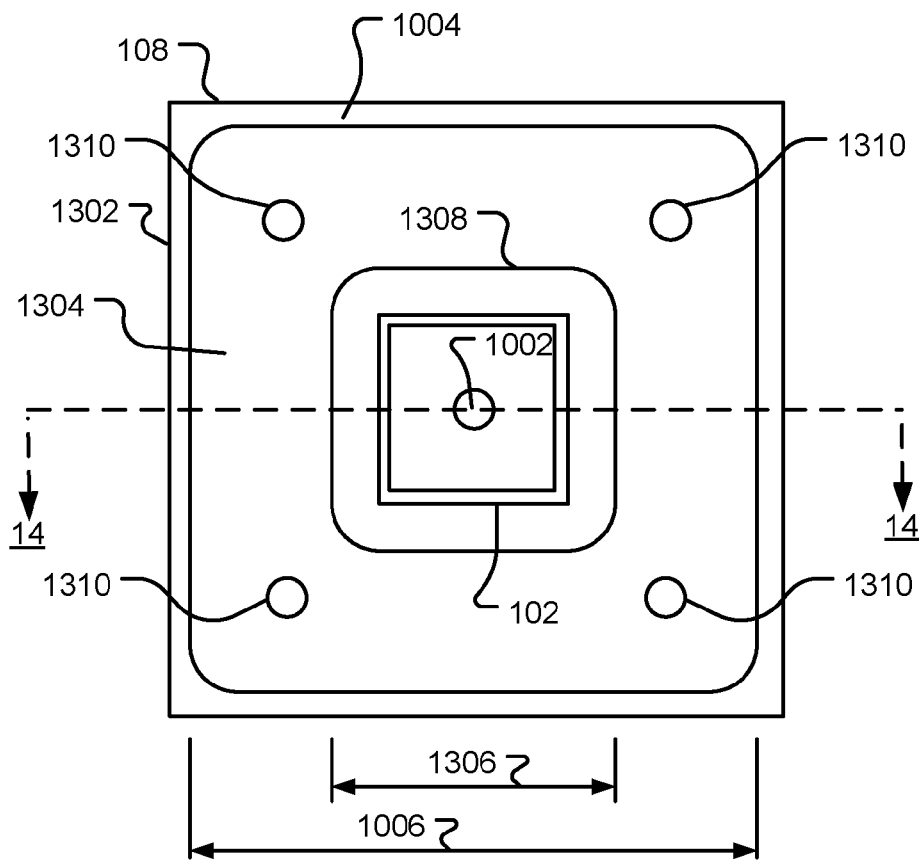
FIG. 13 is a diagrammatic representation of a lower portion of a cable railing support assembly viewed from above, consistent with certain embodiments.

FIG. 13 is a diagrammatic representation of a lower portion of a cable railing support assembly viewed from above, consistent with certain embodiments. In this embodiment, the base support 108 includes a lower plate 1302 that is attached to the elongated member 102, and an upper plate 1304 that provides a lower support for the decorative sleeve. The lower plate 1302 has sufficient strength to provide structural support for the post. In one embodiment, the plate is approximately 3/8" thick. In further embodiments, the plate thickness is as little as 1/4", but may be thicker, such as approximately 1/2", 3/4" or 1". The thickness may be selected according to the material of the base support bracket and/or the height of the post.

The upper plate 1304 may have a central cut-out 1308 with sufficient width 1306 to enable it to be positioned before or after the elongated member 102 is joined to the base support bracket 108. The upper plate 1304 also has a number of holes 1301 that align with corresponding holes in the lower plate 1302. The dimension 1006 of the upper plate is selected to mate with an internal dimension of a decorative sleeve. Thus, in use, the upper plate prevents lateral motion of the decorative sleeve. The upper plate may be joined to the lower plate during manufacture, or may be supplied separately and held in place by the base support bracket fixings. More than one upper plate may be stacked to allow for decorative sleeves of different internal dimensions.

Figure 14:
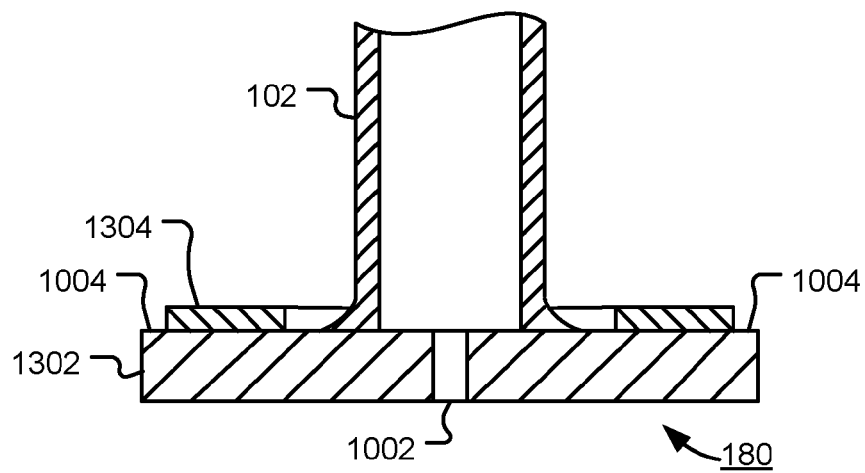
FIG. 14 is a view of the section 14-14 shown in FIG. 13.

FIG. 14 is a view of the section 14-14 shown in FIG. 13. This view illustrates how the combination of the lower plate 1302 and the upper plate 1304 form a step 1004 and a raised platform 1304. Hole 1002 is open to the interior of the elongated member 102 to provide drainage.

Figure 15:
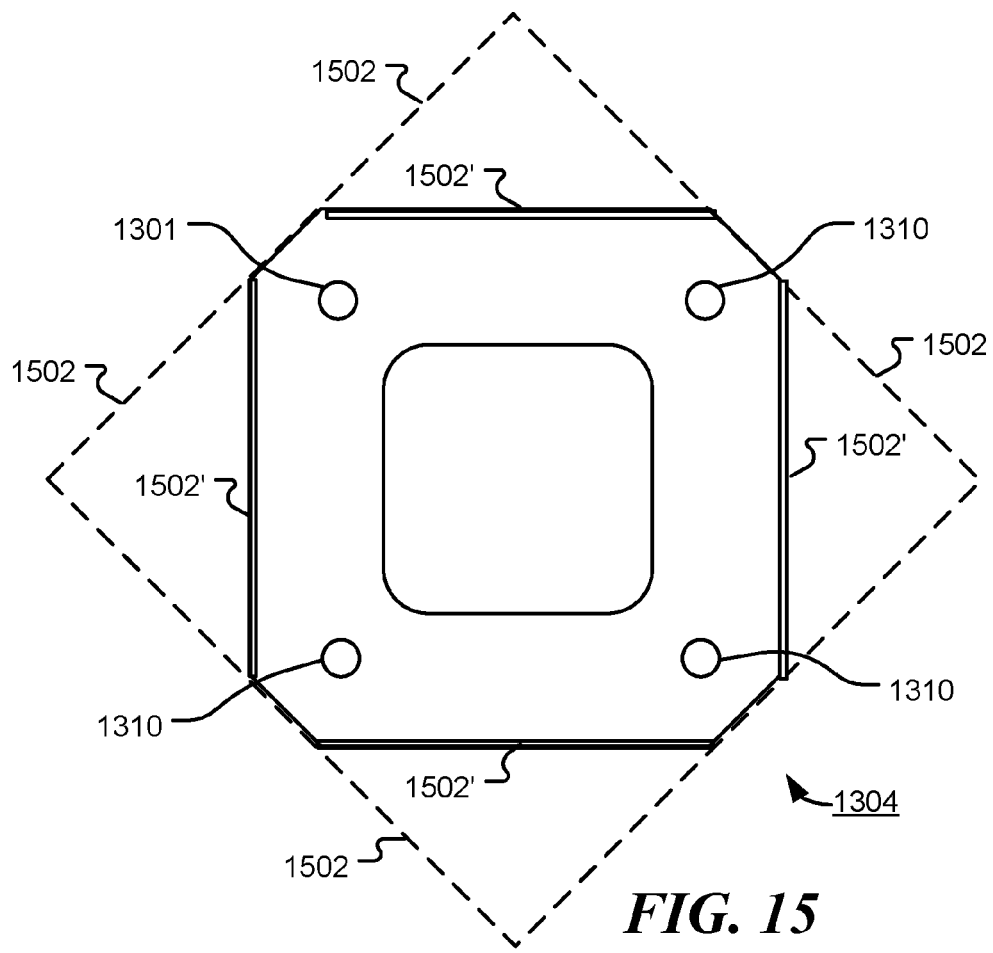
FIG. 15 is a diagrammatic representation of an upper plate of a base support bracket of a cable railing support post viewed from above, consistent with certain embodiments.

FIG. 15 is a diagrammatic representation of a further upper plate of a base support bracket of a cable railing support post viewed from above, consistent with certain embodiments. In this embodiment, the upper plate 1304 is cut from a sheet of metal. Holes 1310 and central cut-out 1308 may be cut during the same process step. The corners 1502 of the plate are bent upwards to positions 1502' at approximately 90° to the plate. The cutting and bending may be performed in a single stamping process or as separate processes. In one embodiment, perforations are cut along the bend lines to facilitate bending during manufacture or bending at a later time, such as the time of installation.

Figure 16:
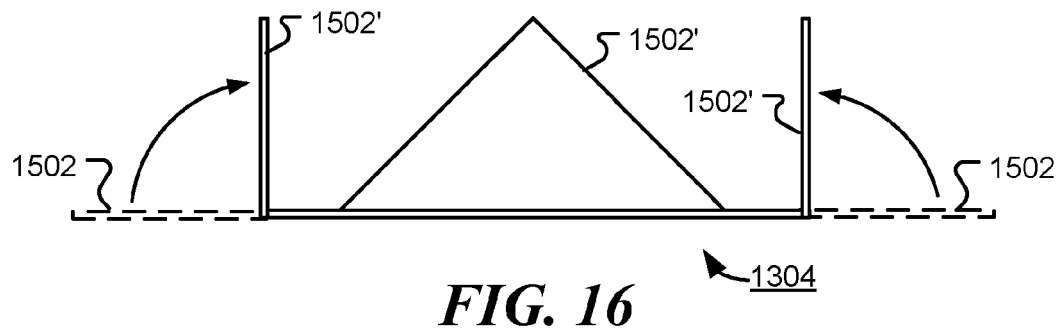
FIG. 16 is a side view of the upper plate shown in FIG. 15.

FIG. 16 is a side view of the upper plate shown in FIG. 15. This view shows the corner 1502' at approximately 90° to the lower portion of the plate. The corners function as guides for a decorative sleeve as it is passed over the support post and prevent lateral motion of the decorative sleeve once it is positioned.

Figure 17:
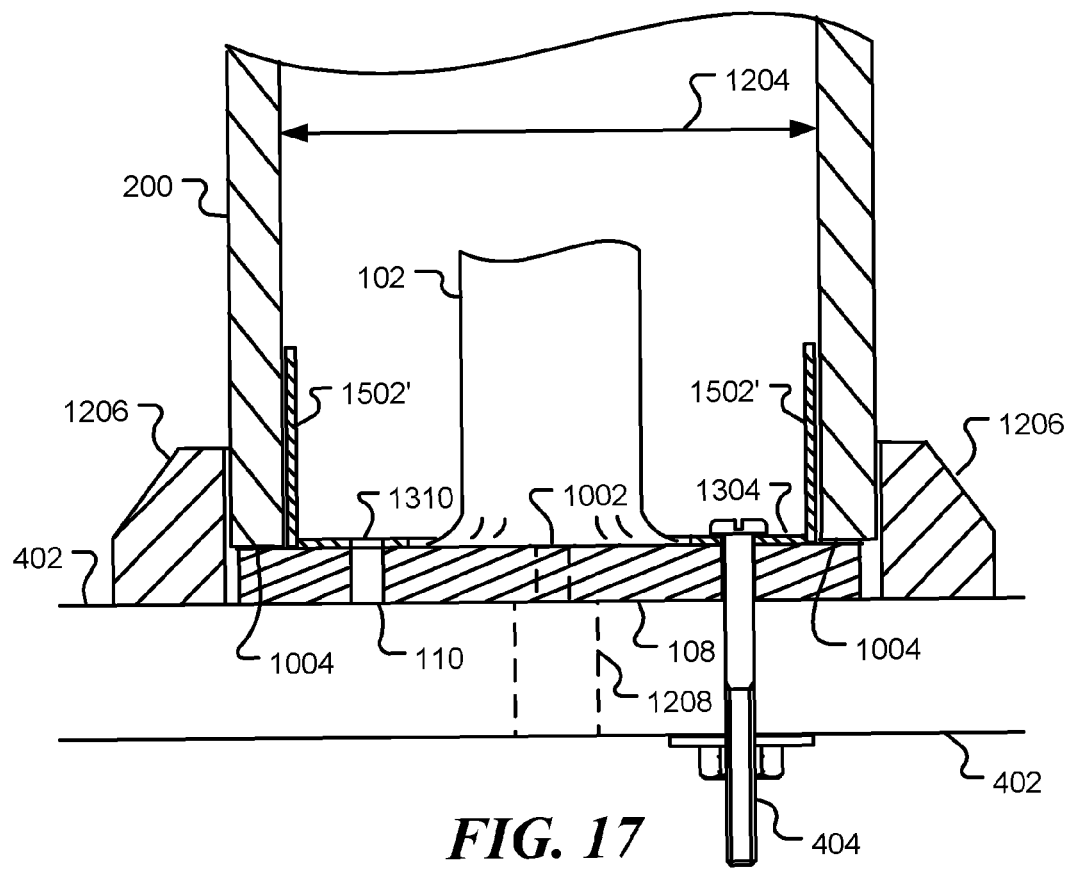
FIG. 17 is a diagrammatic representation of a lower portion of a cable railing support post assembly, consistent with certain embodiments.

FIG. 17 is a diagrammatic representation of a lower portion of a cable railing support post assembly, consistent with certain embodiments. As described above, the corners 1502' function as guides for a decorative sleeve 200 as it is passed over the support post 102 and prevent lateral motion of the decorative sleeve 200 once it is positioned. The material of the upper plate 1304 may be selected to allow for manual flexing of the corners 1304 to accommodate manufacturing variability in the decorative sleeves. Fixings 404 pass through aligned holes 1310 in the upper plate and 110 in the lower plate and server to support the post and join the upper plate 1304 to the lower plate of base 108.

In accordance with various embodiments presented herein, a cable rail support post is produced by a process, the process comprising: providing an elongated member having one or more walls; flow-drilling a plurality of holes in at least one wall of the elongated member, the holes spaced along a length of the elongated member, where the flow-drilling of a hole increases the thickness of the wall in the vicinity of the hole; tapping the plurality of flow-drilled holes to produce a plurality of threaded receivers spaced along a length of the elongated member, the plurality of threaded receivers configured to receive cable rail fittings; and joining a base support bracket to a lower end portion of the elongated member, the base support bracket configured to enable the cable rail support post to be fastened to a surface.

Further in accordance with embodiments described herein a method of manufacturing a cable rail support post is provided, the method comprising: providing an elongated member having one or more walls; providing a base support bracket; forming a plurality of threaded receivers spaced along a length of the elongated member, a threaded receiver of the plurality of threaded receivers produced by: flow-drilling a hole in a wall of the elongated member, where the flow drilling increases the thickness of the wall in the vicinity of the hole; and tapping the flow-drilling hole, forming a plurality of mounting holes in the base support bracket; and welding a base support bracket to an end of the elongated member, where the threaded receivers are configured to receive rail fittings.

Also provided is a cable rail support post in accordance with the various embodiments described herein, the cable rail support post comprising: an elongated member having one or more walls; a plurality of thread receivers comprising tapped holes in at least one wall of the elongated member, the holes spaced along a length of the elongated member, the plurality of threaded receivers configured to receive cable rail fittings; and a base support bracket coupled to a lower end portion of the elongated member, the base support bracket configured to enable the cable rail support post to be fastened to a surface and further configured to support a lower portion of a hollow decorative sleeve placed over the support post, the base support post comprising one or more raised platforms, a raised platform of the one or more raised platforms sized to engage an interior dimension of the lower portion of the hollow decorative sleeve.

The implementations of the present disclosure, described above, are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A cable rail assembly comprising:
   first and second post sleeves, each having a plurality of holes located along a length of the post sleeve;
   first and second support posts, which share a common configuration, each having a first plurality of cable receivers spaced along a first length of the support post and a second plurality of cable receivers spaced along a second length of the support post in opposition to and in alignment with the first plurality of cable receivers, wherein the first support post is sized to fit within the first post sleeve to form a first cable rail support and the second support post is sized to fit within the second post sleeve to form a second cable rail support; and
   a plurality of cable rails configured for tensioning between the first and second support posts, each cable rail comprising:
   a cable;
   a first cable rail fitting for coupling the cable to the first or second support post, having a first end for receiving the cable and a second threaded end for coupling to a cable receiver of the first and second support posts;
   wherein each cable receiver of the first and second support posts comprises a threaded hole sized to receive the first cable rail fitting of the cable rail,
   wherein each cable receiver of the first and second support posts is sized to receive a cable of the plurality of cable rails therethrough,
   wherein each of the plurality of holes of the first and second post sleeves is located to align with a respective one of the cable receivers of the first and second support posts to enable a cable of the plurality of cable rails to be passed through respective ones of the first plurality and second plurality of cable receivers and corresponding aligned holes of the first or second post sleeves, and thereby enable each of the first and second support posts to be used as an end post or an intermediate post, and
   wherein a first end portion of the cable is configured to couple, via the first cable rail fitting, to a cable receiver of the first or second support post, the second threaded end of the first cable rail fitting extending through a respective one of the holes of the first and second post sleeves and threadably engaging the threaded hole of the cable receiver.

2. The cable rail assembly of claim 1, where each cable rail of the plurality of cable rails further comprises:
   a second cable rail fitting for coupling the cable of the cable rail to the first or second support post, the second cable rail fitting having a first end for receiving the cable and a second threaded end for coupling to a cable receiver of the first and second support posts,
   wherein a second end portion of the cable is configured to couple, via the second cable rail fitting, to a cable receiver of the first or second support post to enable the cable rail to be tensioned between the first and second support posts, the second threaded end of the second cable rail fitting extending through a respective one of the holes of the first and second post sleeves and threadably engaging the threaded hole of the cable receiver.

3. The cable rail assembly of claim 1, further comprising a third plurality of cable receivers spaced along a third length of the support post and oriented perpendicular to the first plurality of cable receivers to enable each of the first and second support posts to be used as an end post or a corner post.

4. The cable rail assembly of claim 1, further comprising a third support post that shares the common configuration with the first and second support posts, each support post of the first, second and third support posts having:
   a first plurality of cable receivers spaced along a first length of the support post;
   a second plurality of cable receivers spaced along a second length of the support post and located in opposition to and in alignment with the first plurality of cable receivers; and
   a third plurality of cable receivers spaced along a third length of the support post, oriented perpendicular to the first plurality of cable receivers,
   whereby each of the first, second and third support posts may be used as an end post, an intermediate post or a corner post.

5. The cable rail assembly of claim 1, wherein the plurality of holes in a post sleeve of the first and second post sleeves are aligned at a predetermined angle to the cable receivers of a support post of the first and second support posts.

6. The cable rail assembly of claim 1, wherein the post sleeve of the first and second post sleeves comprises a column.

7. The cable rail assembly of claim 1, further comprising a guard rail coupled between the first and second cable rail supports.

8. The cable rail assembly of claim 1, further comprising a post trim ring for positioning around a lower end of the first post sleeve, the post trim ring configured to surround the end of a cable rail support of the first and second cable rail supports.

9. The cable rail assembly of claim 1, further comprising a sleeve support bracket configured to couple between the support post and the post sleeve of the first cable rail support.

10. The cable rail assembly of claim 1, further comprising a base support bracket coupled to a lower end portion of the first support post, the base support bracket configured to enable the first support post to be fastened to a surface and further configured for location inside the post sleeve such that a gap is maintained between the post sleeve and the support post.

11. The cable rail assembly of claim 1, where the wall surrounding a threaded hole of a cable receiver of the first and second support posts has an increased thickness.

12. The cable rail assembly of claim 1, where the wall surrounding a threaded hole of a cable receiver of the first and second support posts has an increased thickness as a result of being formed by flow-drilling.

13. A cable rail assembly for supporting a plurality of cable rails, the assembly comprising:
   a plurality of post sleeves, each post sleeve having a plurality of holes located along a length of the post sleeve;
   a plurality of support posts that share a common configuration, each support post having:
   a first plurality of cable receivers spaced along a first length of the support post;
   a second plurality of cable receivers spaced along a second length of the support post and oriented perpendicular to the first plurality of cable receivers;
   a third plurality of cable receivers spaced along a third length of the support post, located in opposition to and in alignment with the first plurality of cable receivers; and
   a cable rail configured for tensioning between first and second support posts, the cable rail comprising:
   a cable:
   a first cable rail fitting for coupling the cable to one of the support posts, having a first end for receiving the cable and a second threaded end for coupling to a cable receiver of the support post,
   wherein each support post is sized to fit within a respective one of the post sleeves to form a cable rail support;
   wherein each cable receiver of each support post comprises a threaded hole sized to receive the first cable rail fitting of the cable rail,
   wherein each cable receiver of each support post is sized to receive the cable of the cable rail therethrough;
   wherein each of the plurality of holes of each post sleeve is located to align with a respective one of the cable receivers of one of the support posts to enable the cable of the cable rail to be passed through respective ones of the first plurality and third plurality of cable receivers and corresponding aligned holes of the post sleeve;
   wherein a first end portion of the cable is configured to couple, via the first cable rail fitting, to a cable receiver of one of the support posts, the second threaded end of the first cable rail fitting extending through a respective one of the holes of the post sleeve and threadably engaging the threaded hole of the cable receiver; and
   wherein each support post may be used as an end post, an intermediate post or a corner post.

14. The assembly of claim 13, further comprising a sleeve support bracket configured to couple between the support post and the post sleeve of one of the cable rail supports.

15. The assembly of claim 13, further comprising a base support bracket coupled to a lower end portion of the support post of one of the cable rail supports, the base support bracket configured to enable the support post to be fastened to a surface and further configured for location inside the post sleeve such that a gap is maintained between the post sleeve and the support post.

16. A method for assembling a cable rail assembly, the method comprising:
   providing first and second post sleeves, each having a plurality of holes located along a length of the post sleeve;

providing first and second support posts, which share a common configuration, each having a first plurality of cable receivers spaced along a first length of the support post and a second plurality of cable receivers spaced along a second length of the support post in opposition to and in alignment with the first plurality of cable receivers;

positioning the first post sleeve over the first support post to form a first cable rail support;

positioning the second post sleeve over the second support post to form a second cable rail support;

passing a first cable rail fitting at least partially through a hole of the first post sleeve and coupling the first cable rail fitting to a cable receiver of the first support post, the first cable rail fitting having a first end for receiving a cable and a second threaded end for coupling to the cable receiver, wherein each cable receiver of the first and second support posts comprises a threaded hole sized to receive the first cable rail fitting; and coupling a first end portion of a cable to the first support post via the first cable rail fitting, the second threaded end of the first cable rail fitting extending through the hole of the first post sleeve and threadably engaging the threaded hole of the cable receiver, wherein each cable receiver of the first and second support posts is sized to receive the cable therethrough, and wherein each of the plurality of holes of the first and second post sleeves is located to align with a respective one of the cable receivers of the first and second support posts to enable the cable to be passed through respective ones of the first plurality and second plurality of cable receivers and corresponding aligned holes of the first or second post sleeves, and thereby enable each of the first and second support posts to be used as an end post or an intermediate post.

17. The method of claim 16, further comprising:
passing a second cable rail fitting at least partially through a hole of the second post sleeve and coupling the second cable rail fitting to a cable receiver of the second support post, the second cable rail fitting having a first end for receiving the cable and a second threaded end for coupling to the cable receiver; and coupling a second end portion of the cable to the second support post via the second cable rail fitting, the second threaded end of the second cable rail fitting extending through the hole of the second post sleeve and threadably engaging the threaded hole of the cable receiver; and tensioning the cable between the first and second support posts.

18. The method of claim 16, the method further comprising:
passing the cable through the second cable rail support; and
tensioning the cable to the first support post.

19. The method of claim 16, comprising positioning the first post sleeve over the first support post prior to coupling the first cable rail fitting to the cable receiver of the first support post.

20. The method of claim 16, further comprising:
providing a third post sleeve having a plurality of holes located along its length;
providing a third support post that shares the common configuration with the first and second support posts;
positioning the third post sleeve over the third support post to form a third cable rail support;
passing the cable through the third cable rail support;
passing a second cable rail fitting at least partially through a hole of the second post sleeve and coupling the second cable rail fitting to a cable receiver of the second support post, the second cable rail fitting having a first end for receiving the cable and a second threaded end for coupling to the cable receiver; and
coupling a second end portion of the cable to the second support post via the second cable rail fitting, the second threaded end of the second cable rail fitting extending through the hole of the second post sleeve and threadably engaging the threaded hole of the cable receiver; and
tensioning the cable between the first and second support posts.

* * * * *